(No Model.) 2 Sheets—Sheet 1.

S. E. SHUTE.
ROLLER SKATE.

No. 337,205. Patented Mar. 2, 1886.

WITNESSES:
Fred. G. Dieterich.
Arthur L. Morsell.

INVENTOR.
Samuel E. Shute,
By Louis Bagger & Co.
ATTORNEYS.

(No Model.) 2 Sheets—Sheet 2.

S. E. SHUTE.
ROLLER SKATE.

No. 337,205. Patented Mar. 2, 1886.

WITNESSES:
Fred. G. Dieterich.
Arthur L. Morsell.

INVENTOR.
Samuel E. Shute,
By Louis Bagger & Co,
ATTORNEYS.

N. PETERS, Photo-Lithographer, Washington, D. C.

UNITED STATES PATENT OFFICE.

SAMUEL E. SHUTE, OF RICHMOND, INDIANA, ASSIGNOR, BY MESNE ASSIGNMENTS, TO CHARLES A. SHAW, OF BOSTON, MASSACHUSETTS.

ROLLER-SKATE.

SPECIFICATION forming part of Letters Patent No. 337,205, dated March 2, 1886.

Application filed January 23, 1884. Serial No. 118,450. (No model.)

*To all whom it may concern:*

Be it known that I, SAMUEL E. SHUTE, a citizen of the United States, and a resident of Richmond, in the county of Wayne and State of Indiana, have invented certain new and useful Improvements in Roller-Skates; and I do hereby declare that the following is a full, clear, and exact description of the invention, which will enable others skilled in the art to which it appertains to make and use the same, reference being had to the accompanying drawings, which form a part of this specification, and in which—

Figure 1:
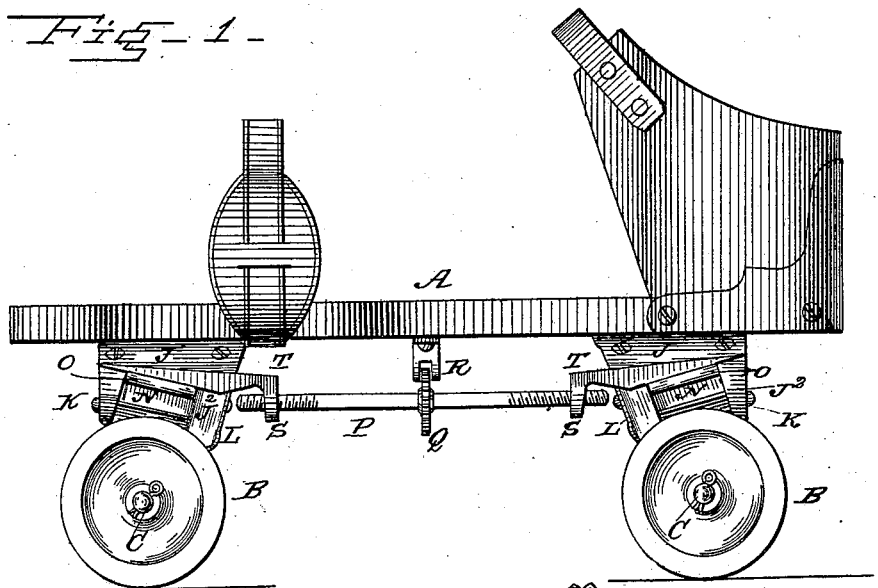
Figure 2:
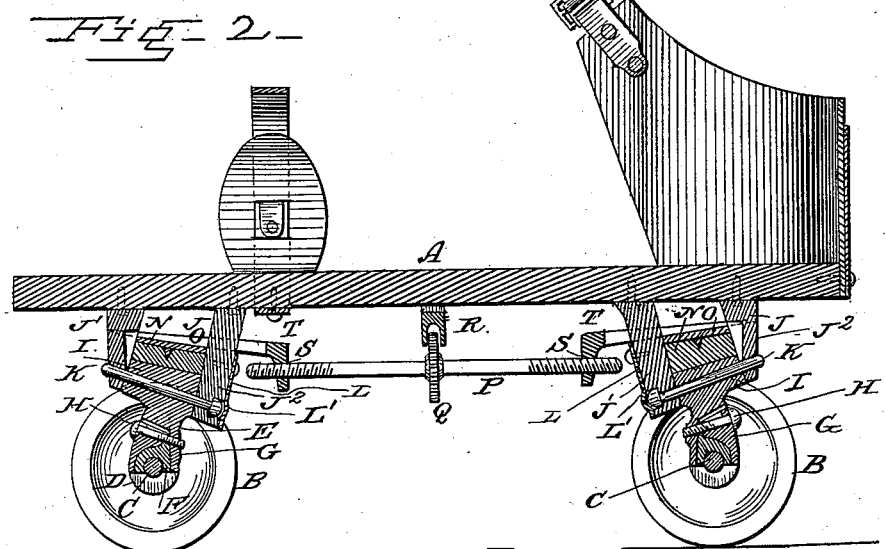
Figure 3:
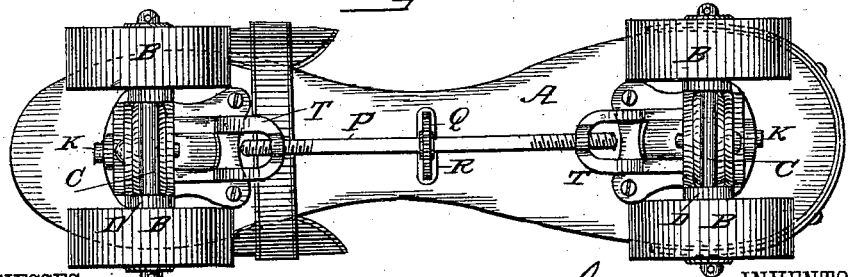
Figure 4:
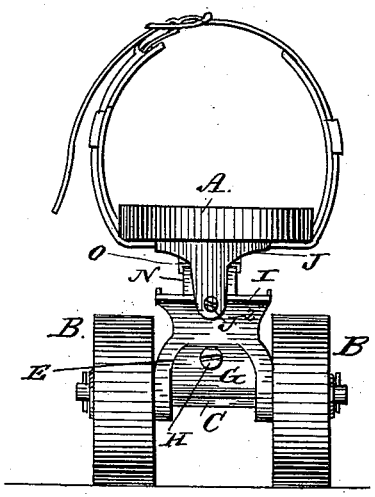
Figure 5:
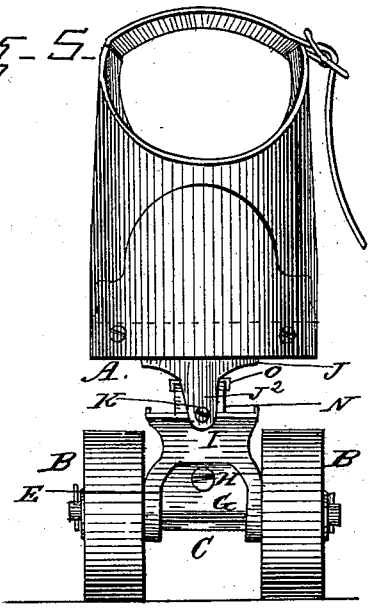
Figure 6:
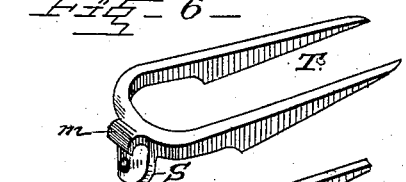
Figure 7:
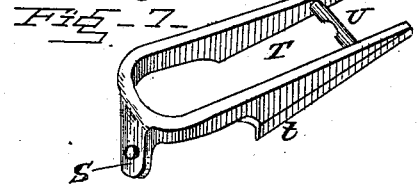
Figure 8:
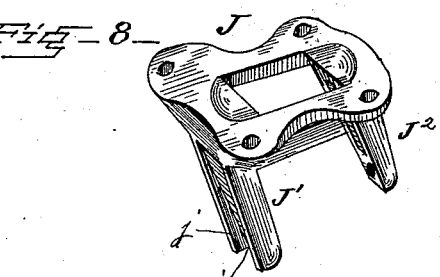
Figure 9:
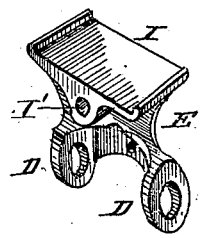
Figure 10:
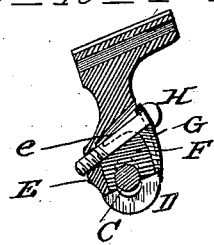
Figure 11:
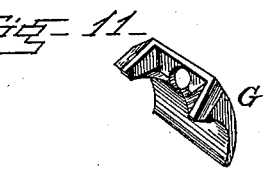
Figure 12:
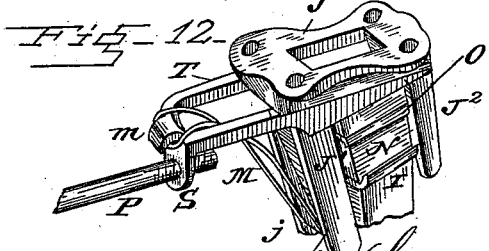

Figure 1 is a side elevation of my improved roller-skate. Fig. 2 is a longitudinal sectional view of the same. Fig. 3 is a bottom view. Fig. 4 is a front view. Fig. 5 is a rear view. Fig. 6 is a perspective detail view of one of the adjustable tension-wedges. Fig. 7 is a similar view showing a modified construction of the same. Fig. 8 is a perspective detail of one of the fixed bearing-plates. Fig. 9 is a similar view of the bolster-plate with its journal-bearings; and Figs. 10, 11, and 12 are detail views of parts which will be hereinafter more fully described.

Similar letters of reference indicate corresponding parts in all the figures.

My invention has relation to roller-skates; and it consists in the improved construction and combination of parts which will be hereinafter more fully described and claimed.

On the accompanying two sheets of drawings, A denotes the foot-plate, and B the rollers. C are the axles, which are inserted through oblong bearings D in the axle-boxes E, into which are inserted rubber cushions or bolsters F, shaped to fit into the box and held in place therein by blocks G and screws H. The inside top part of box E, between the slotted bearings D D, is cut away obliquely at an incline of about forty-five degrees, more or less, as shown at e, Fig. 10, to fit the bevel of the adjustable block G, so that by tightening up screw H the rubber block or cushion F will be compressed in an oblique direction against axle C, thereby holding it in its bearings D D with a force or tension commensurate to the tightening of the screw H. This construction permits of a limited vertical play of the axles in their bearings, cushioning the axle, and preventing breakage of the same by the jarring which results on using the skates on a rough surface.

The upper part of the box E is enlarged to form a flanged plate, which I call a "bolster-plate," I, which is removably pivoted to the fixed bearing-plate J by means of a bolt, K, which is inserted through holes in the lugs J' and J² of plate J, and through the hole I' beneath the surface of said bolster-plate, and held in place by a turn-button, L, having a depression, L', in its free end, into which the head of the bolt K falls, or by a spring, M, as shown in Fig. 12, or by other suitable means.

Where a spring is used, as at M in Fig. 12, its double end is slipped over and held upon a lip, m, upon the inner end of the tension-wedge, the free ends of the spring bearing against the head of the bolt K between flanges $jj$ on the part J'.

Although I have herein illustrated and described the device referred to as the "hinged latch" or "turn-button," L, no claim is laid thereto, as I prefer to seek protection on this feature of my invention in a subsequent application for Letters Patent.

Inserted between the downward projecting oblique or slanting lugs J' and J², is a block, N, of rubber or other suitable material, the under side of which bears against the bolster-plate I, and its upper end or top against the cap-plate O, adapted to fit between the lugs J' and J².

P is a steel rod, having a right and left handed screw-thread cut at opposite ends, and having a milled wheel, Q, fixed upon its middle, so that by turning the wheel the rod will turn with it. Fastened upon the under side of the foot-plate is a small block, R, the lower end of which is bifurcated for the insertion of the rim of the turn-wheel Q, whereby said wheel is prevented from moving either forward or back. Each of the screw-threaded ends of rod P is inserted through and works in a threaded lip or projection, S, on the inner end of a wedge, T, which is in the shape of a fork with its wedge-shaped tines inserted between the under side of plate J and the upper side of the cap-plate O, outside of the downwardly-projecting lugs J' and J². It follows that by turning the wheel Q in one direction the forked wedges T T will be forced apart from each other into the spaces between the fixed plates J and movable cap-plates O, at opposite ends of the skate, and the elastic block N, which is confined between the movable cap-plate O and bolster-plate I is thereby compressed, while by turning the wheel Q in the opposite direction the forked wedges will be drawn toward each other, or out from the wedge-shaped space between plates J and O, thereby permitting block N to expand. In other words, it will be seen that by turning the wheel Q in one direction the tension or pressure upon the bolster-plates which are hung upon bolts K and carry the rollers, will be increased through compression of the elastic blocks, while by turning the wheel in the opposite direction it will be relaxed by permitting the elastic block to expand. It will further be seen that this adjustment will be exactly the same, both as regards the front and back rollers, inasmuch as the threads at opposite ends of rod P are cut with the same pitch, thus balancing the tension or pressure against the roller-bearings both at the front and rear end of the skate.

While for convenience I prefer to use the notched or bifurcated block R for wheel Q to turn in, the same result may be effected by having the rim of the wheel project into a notch or groove cut in the foot-plate of the skate; or other means may be adopted for preventing motion of rod P in the direction of its length. Again, if desired, the forked wedges T may be constructed with flanged ways $t$, as shown in Fig. 7, sliding upon shoulders on the under side of plate J, and the forked wedge may be constructed with a crossbar, U, connecting its sides and extending through between the downwardly-projecting inclined lugs $J'$ and $J^2$, for the twofold purpose of increasing its strength and limiting its forward and backward play, thereby preventing the forks from being drawn back so far as to cause their ends to become disengaged from the plates J and O. If desired, the cap-plate O may be grooved or flanged (in like manner as the under side of the fixed plates J) to form ways for the sides of the wedge-shaped forks T.

From the foregoing description it will be seen that the tension or pressure against the roller-bearings, front and back, may be adjusted and balanced with the utmost degree of accuracy, and without removing the skate from the foot, simply by turning the center wheel, Q, to one side or to the other. By making the flat top of the bolster-plates I wider than the elastic block or cushion N, which is interposed between them and the cap-plates O, the bolster-plate will not cut or otherwise injure the elastic block as the foot-plate rocks from one side to the other, thereby greatly increasing the durability as well as the efficacy of the elastic bearings.

Having thus described my invention, I claim and desire to secure by Letters Patent of the United States—

1. As an improvement in roller-skates, the combination, with the yielding bearings of the front and rear rollers, of elastic blocks and a tension-adjusting device which operates simultaneously upon the front and rear blocks for evenly adjusting the tension thereof.

2. As an improvement in roller-skates, the combination, with the yielding or elastic bearings of the front and back rollers, of the wedges for adjusting the tension or pressure against the elastic bearing-blocks, the rod having a right and left handed screw for operating the front and back wedges simultaneously and evenly, the wheel for turning the rod, and means for preventing the same from moving in the direction of its length, substantially as and for the purpose shown and set forth.

3. As an improvement in roller-skates, the combination, with the yielding or elastic bearings of the front and back rollers, of wedges inserted between the fixed and movable bearing-plates, so as to regulate or adjust the tension or pressure against the elastic bearing-blocks, and means for operating the said wedges simultaneously and evenly or to the same extent, substantially as and for the purpose shown and set forth.

4. The combination of the fixed bearings J $J'$ $J^2$, cap-plates O, elastic blocks N, bolts K, axle-boxes E I, forked wedges T, screw-threaded rod P, having turn-wheel Q, and means for preventing said rod from moving in the direction of its length, substantially as and for the purpose shown and set forth.

5. The combination of the fixed bearings J $J'$ $J^2$, cap-plates O, elastic blocks N, bolts K, axle-boxes E I, forked wedges T, having cross-bars U, screw-threaded rod P, having turn-wheel Q, and means for preventing said rod from moving in the direction of its length, substantially as and for the purpose shown and set forth.

6. The combination of the fixed bearings J $J'$ $J^2$, cap-plates O, elastic blocks N, bolts K, axle-boxes E, having enlarged flanged bolster-plates I, forked wedges T, having ways $t$, screw-threaded rod P, having turn-wheel Q, and means for preventing said rod from moving in the direction of its length, substantially as and for the purpose shown and set forth.

7. The combination of the fixed bearings J $J'$ $J^2$, movable axle-box E I, elastic block N, bolt K, and spring M, adapted to bear with its free end against the head of the bolt, substantially as and for the purpose shown and set forth.

8. The combination of the fixed bearings J $J'$ $J^2$, movable axle-box E I, elastic block N, cap-plate O, bolt K, forked shaped wedge T, having lip $m$ and spring M, its inner end being held under said lip, and its free end adapted to bear against the head of said bolt.

9. The combination of the fixed bearings J $J'$ $J^2$, the bearing $J'$ being provided with forwardly-projecting flanges *j* at each side, movable axle-box E I, elastic block N, cap-plate O, bolt K, forked-shaped wedge T, and spring M, whose free end is adapted to rest between said flanges against the head of said bolt.

10. The combination of the fixed bearings J J' J², the bearing J' being provided with forwardly-projecting flanges *j* at each side, movable axle-box E I, elastic block N, cap-plate O, bolt K, forked-shaped wedge T, having lip *m* and spring M, whereof the inner end is held under said lip and the free end adapted to rest between said flanges and bear against the head of said bolt.

11. In a roller-skate, the axle-box E, having downwardly-projecting ears at each side provided with oblong bearings D, said axle-box being also provided with a bevel, *e*, between and above the line of said bearings, in combination with the axle C, inserted through and playing in said bearings, an elastic block, F, interposed in the space between said axle and the bevel *e*, and a screw, H, for compressing said elastic block within said space and thus increasing its tension upon the parts.

12. In a roller skate, the axle-box E, having downwardly-projecting ears at each side provided with oblong bearings D, said axle-box being also provided with a bevel, *e*, between and above the line of said bearings, in combination with the axle C, inserted through and playing in said bearings, an elastic block, F, interposed in the space between said axle and the bevel *e*, a block, G, closing the open side of said space and having a beveled upper face adapted to rest against said bevel *e* when the block is in place, and a screw, H, passing loosely through a hole in said block and into a screw-threaded hole in said axle-box, whereby the block G may be drawn obliquely against the elastic block F for compressing it within said space, and thus increasing its tension upon the parts.

13. The combination, in a roller-skate, of the following elements: fixed bearings J J' J², cap-plates O, elastic blocks N, bolts K, springs M, movable axle-boxes E, having bolster-plates I and oblong axle-bearings D, elastic blocks F, beveled pressure-blocks G, adjusting-screws H, axles C, having rollers B, fork-shaped wedges T, screw-threaded rod P, having turn-wheel Q, and means for preventing said rod from moving in the direction of its length, substantially as and for the purpose shown and set forth.

In testimony that I claim the foregoing as my own I have hereunto affixed my signature in presence of two witnesses.

SAMUEL E. SHUTE.

Witnesses:
AUGUST PETERSON,
LOUIS BAGGER.